Nov. 2, 1943.    G. H. DOWTY    2,333,096
RESILIENT SUSPENSION DEVICE
Filed Jan. 11, 1940    4 Sheets-Sheet 3
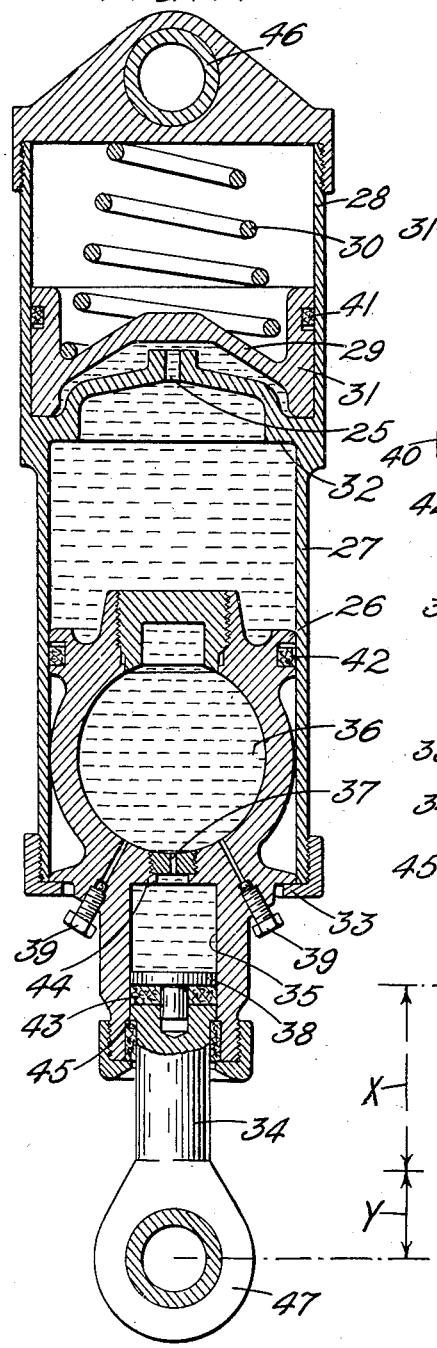
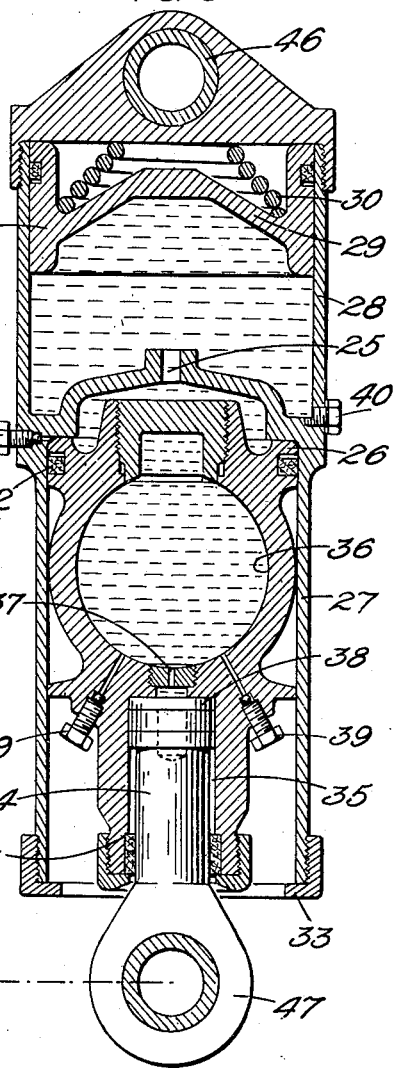
Inventor,
George H. Dowty
By,
Attnys Nov. 2, 1943.   G. H. DOWTY   2,333,096
RESILIENT SUSPENSION DEVICE
Filed Jan. 11, 1940   4 Sheets-Sheet 4

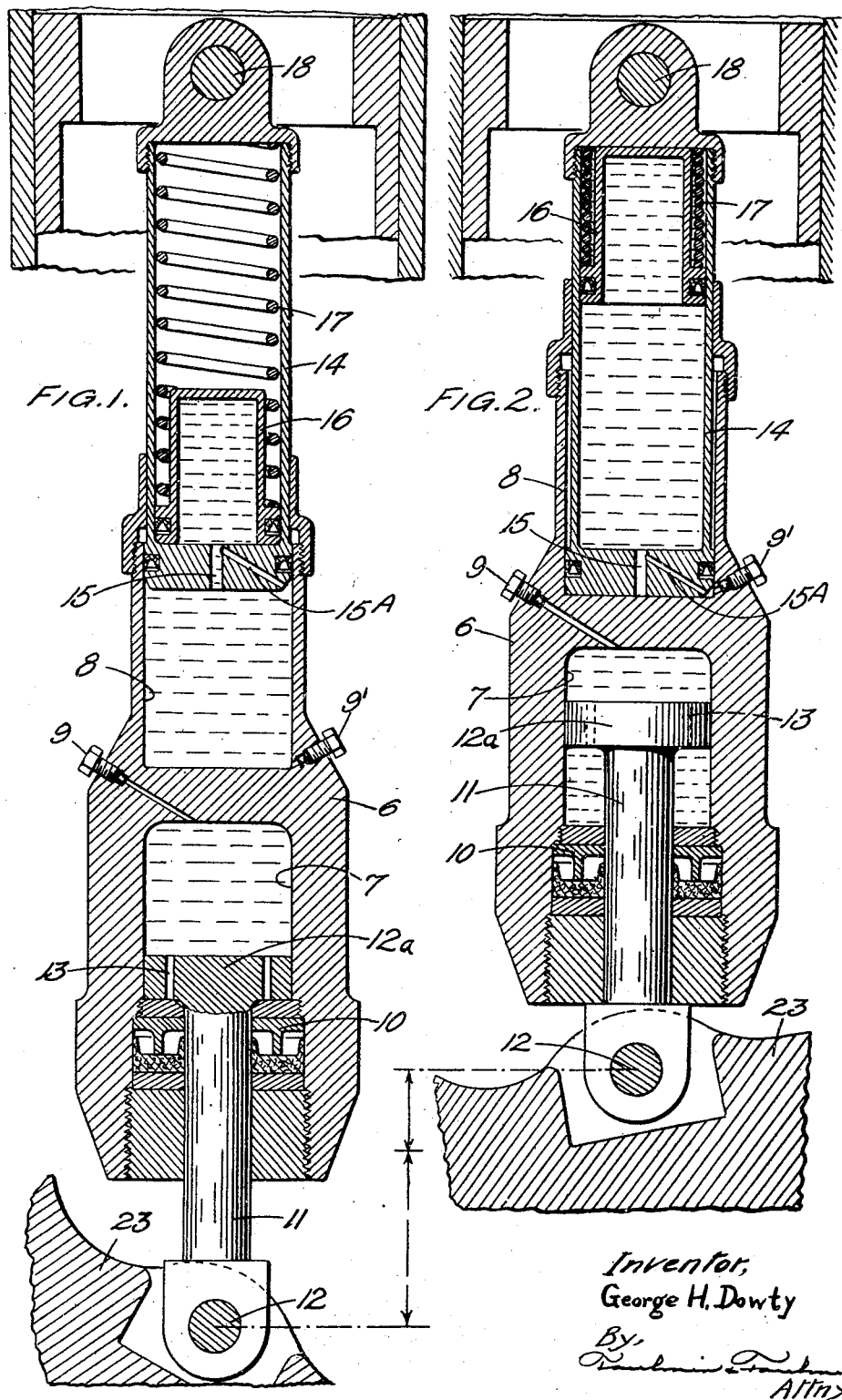

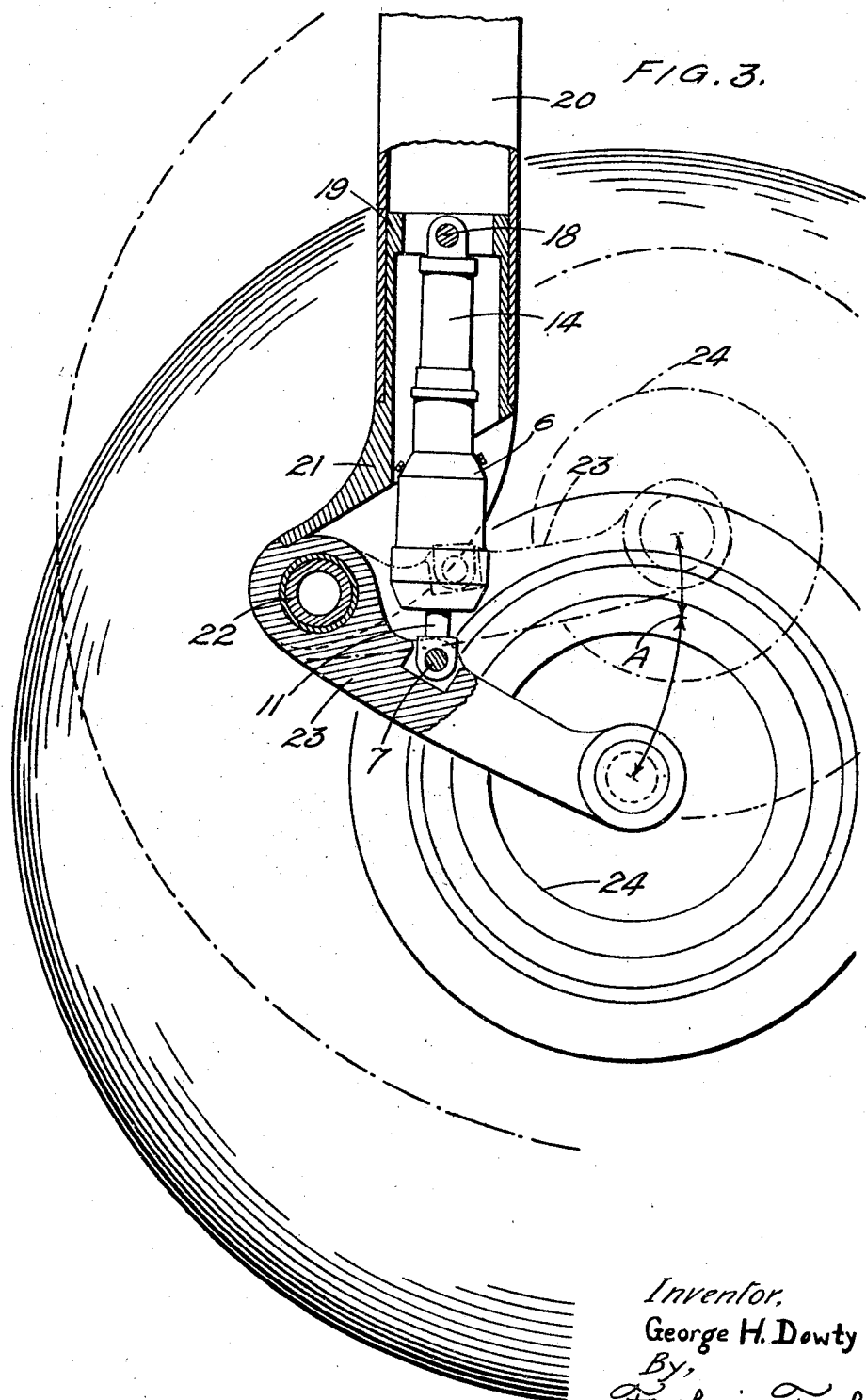

Inventor,
George H. Dowty
By,
Attnys

Patented Nov. 2, 1943

2,333,096

UNITED STATES PATENT OFFICE 2,333,096

RESILIENT SUSPENSION DEVICE

George Herbert Dowty, Cheltenham, England

Application January 11, 1940, Serial No. 313,402
In Great Britain January 17, 1939

16 Claims. (Cl. 267—34)

This invention relates to resilient shock absorbers. It is concerned with shock absorber means, within which term I include devices which, as well as being resilient in action, also dissipate energy and are therefore damped.

The invention is especially concerned with such devices when required to be adapted to the general condition of use, arising particularly in aircraft landing gear, that a first stage of deflection or yield is mainly concerned with energy dissipation, whilst a further stage is concerned with elastic resilience with or without substantial dissipation.

It is an object of this invention to provide a suspension system involving shock absorber means of light weight and small dimensions for a given load and stroke, with good wearing properties, and of which manufacturing and particularly maintenance, are simple.

The particular object of this invention is to provide a body of liquid under compression in which the elastic restoring forces of the compressed liquid serve satisfactorily to restore the shock absorber mechanism to its original position, as well as effecting to absorb the shock with energy dissipation under impact. The resilient resistance is due to the elastic restoring forces of the compressed liquid which in operation may be compressed to the extent of twenty thousand pounds per square inch, fifty thousand pounds per square inch or more.

It is a further object to associate with such compression means means for damping the shock absorption and otherwise regulating it. In this connection, at the commencement of a compression stroke, the rate of flow per rate of deflection is low relatively to the rate of flow per rate of deflection towards the end of the compression stroke by virtue of the compressibility of the liquid. The damping effect is correspondingly higher as the end of the compression stroke is approached.

In the application of so-called shock absorbers to aircraft undercarriages, and more especially for aircraft other than the smallest and lightest types, or in nose wheels of so-called tricycle landing gear, the property is required that the kinetic energy vertically of the aircraft in alighting has to be dissipated during the deflection of the shock absorber, and it is, of course, constructionally desirable from the point of view of compactness, lightness and cheapness, that the stroke of a shock absorber should be as small as possible. On the other hand, when the aircraft is not air-borne, the shock absorber already to some extent deflected by the weight of the aircraft, is not so much required for energy dissipation as for resilient properties.

In a typical case it may, for example, be required to provide a shock absorber with a given total length of travel, and so arrange matters that the first half or two-thirds of the working stroke is concerned primarily with the dissipation of energy, the remaining proportion being primarily with resilience. During the first part of the stroke, however, some resilience may be required, if only because of the necessity to re-extend the shock absorber through its full stroke when it is unloaded. The resilient resistance during the working stroke may therefore be comparatively weak during the first part and comparatively strong during the second part, the order of the resistance changing rapidly in a certain fairly critical region in the stroke which may, for example, be that corresponding to the deflection due to normal load of the aircraft in static conditions. The present invention, according to one feature of it, contemplates that the two resilient resistances, the weak and the strong, are of very different order. It is also deemed to be desirable in shock absorbers that there should be little or no pressure in the unloaded condition, substantial pressure being generated only by the application of loads, and for convenience I term such a shock absorber "self-energizing." The invention when fully applied, seeks to afford the attributes and functions above indicated in an economical and practicable way, and to provide a suspension system including shock absorber means of which maintenance will be reduced to a minimum.

To some extent similar desiderata may arise in connection with vehicle suspension systems. In a motor car, for example, it may be desirable to provide damped resilient suspension in which the actual shock absorber means are small and light, and require but little maintenance. It may also be desirable that the total scope of deflection involves what are virtually two stages, a first stage (corresponding to light load) involving comparatively weak resilient resistance, whilst a second stage (corresponding to heavy load) involves comparatively strong resilient resistance, deflections in both stages involving energy dissipation, not necessarily uniformly and indeed probably in a graduated manner.

The principle underlying the present invention is the employment of the restoring forces of a liquid compressed when the shock absorber means is deflected. A clear distinction must be emphasized in regard to this statement; where I write of "liquid" I am referring to a substance which stable liquid in the conditions (e. g. of temperature) to which it will be subjected in use. The word "liquid" is to be distinguished from gas or vapour. It has been found that suitable liquids include those which are used in hydraulic actuating systems or in oleo-pneumatic aircraft shock absorbers, and they are in the nature of thin, light oils or oil mixtures; this does not, however, exclude the possibility of other liquids being employed.

In previous aircraft suspension systems having shock absorbers, such as oleo-pneumatic shock absorbers, the oil has been subjected to pressures up to, say, five thousand pounds per square inch, and has thereby been made to contact in volume. But in such devices the effective resilient resistance has been due to compressed air (gas), the liquid being used to obtain a dashpot effect. The expansion of the liquid on the release of the pressure made only a small contribution to the outward movement of the shock absorber, this being effectively due to the expansion of the compressed air (gas).

In other more complicated forms the above conditions will obtain for part of the deflection but not for the whole. In such forms, as hereinafter more fully explained, the part of the deflection where the above conditions are fulfilled is preceded by a part where the resilient resistance is of a much lower order than would be caused by the liquid in compression and may for instance be due to a spring. Some expansion of the chamber containing the liquid and some "give" of the parts must take place and therefore some of the resilient resistance must be due to these factors, but it is not believed that they play a great part and, in any event, when it is stated in this specification and in the claims, that the resilient resistance is due to the elastic restoring forces of the liquid compressed when the shock absorber means is deflected, this does not exclude the fact that expansion of the liquid containing chamber due to stretch of the walls and "give" of the parts may take place and exert some elastic restoring forces.

By the term "suspension system" I mean an arrangement of parts or elements adapted yieldingly to support the main structure of a vehicle or aircraft, being interposed or connected between such main structure and the so-called "unsprung" parts, e. g. axles and wheels, skids, endless-tracks, which are ordinarily employed as substructures and which ultimately transmit weight, and running or landing loads, of the complete vehicle or aircraft, to the ground, track, road, or other surface, upon which landing or running occurs. For convenience the main structure will be referred to as the vehicle or aircraft, and the "unsprung" parts will be referred to as the sub-structure.

According to this invention shock absorber means include energy dissipating means displacing liquid through orifice means during part of a shock absorber stroke, said energy dissipating means being arranged to operate in series, mechanically speaking, within a resilient device of which resilience is due, or mainly due, to the elastic compression of liquid. Thus the shock absorber may include as the resilient device a chamber filled with liquid and a plunger slidable through a wall of the chamber so as to occupy more or less volume therein according to the shock absorber deflection, the resistance means being included in an ante-chamber adjacent the liquid compression chamber.

According to another feature of the invention there may be energy dissipating means comprised in or by a damping head provided on the plunger, said damping head being at all times located within the liquid compression chamber and being so arranged that the whole of the liquid which is subjected to compression may be caused to pass through the flow resistance means in a maximum working stroke of the plunger for which the apparatus is designed.

The invention also includes certain structural features, not claimed per se, such as the employment of a certain form of damping device, and the employment of certain dispositions of suspension systems which, when including other types of shock absorber means, are not necessarily novel. Another subordinate feature worthy of mention, is the attachment of the chamber and the plunger by pin or like joints affording angular freedom, to obviate any substantial bending loads being imposed in these parts, so that they work purely in end-load.

The invention will now be described with the aid of the accompanying drawings, which are largely diagrammatic, and in which:

Figure 1 is a sectional elevation showing a shock absorber according to the present invention in a no load condition;

Figure 2 corresponds to Figure 1 but shows the shock absorber deflected;

Figure 3 illustrates the application of a shock absorber shown in Figures 1 and 2 forming part of an aircraft undercarriage;

Figures 4 and 5 are views corresponding to Figures 1 and 2 but illustrate a modified form of shock absorber; whilst

Figure 6:
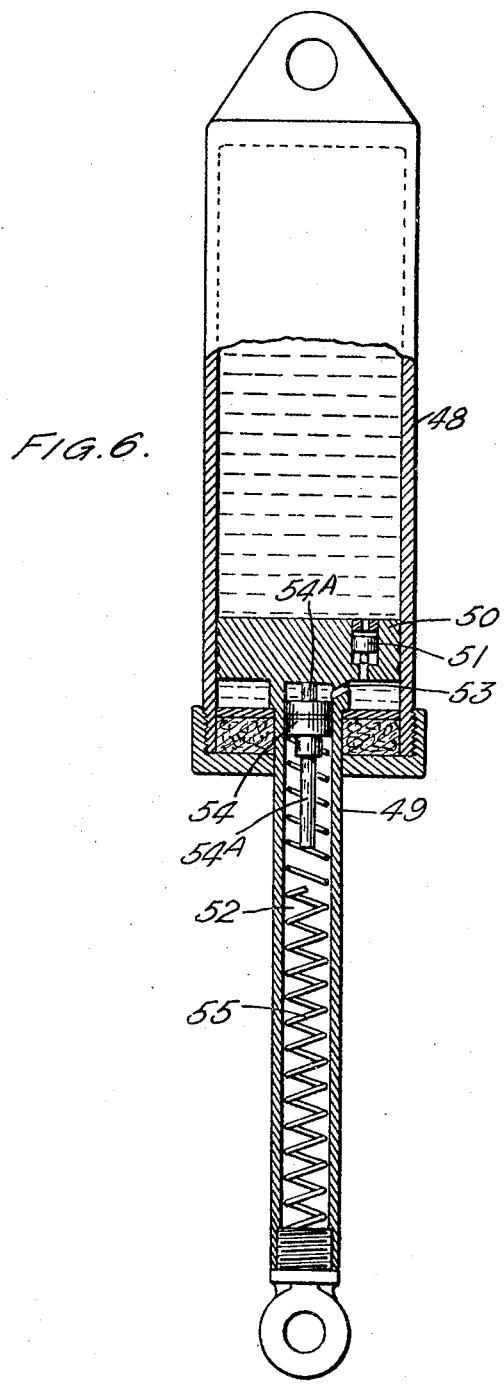
Figure 6 is a side elevation mainly in cross section illustrating a further modified form of the invention.

In Figures 1 and 2, a shock absorber is seen to comprise a telescopic assembly including a cylinder body 6 the lower part of which forms a comparatively thick-walled cylinder 7, and the upper part of which forms a comparatively thin-walled cylinder 8, these cylinders being coaxially in tandem and having no fluid communication between them. Each cylinder may have a filler plug, as indicated at 9 and 9' for the cylinders 7 and 8 respectively. The lower end of the lower cylinder 7 is provided with a gland arrangement illustrated at 10, through which works slidably a plunger 11 pin-jointed at 12 to one of the two parts, relative movement of which is controlled by the shock absorber. The plunger 11 carries inside the cylinder 7 a damping head 12a through which one or more damping orifices 13 are provided. The cylinder 7 is completely filled with liquid so that inward movement of the plunger 11 causes compression of such liquid and it is the elastic compression of the liquid which gives the shock absorber its more important resilience.

Into the upper end of the cylinder 8 there slides a hollow piston 14 the crown of which is furnished with a damping passage or orifice 15. If this orifice is so located that it is liable to be closed up by the abutment of the piston crown against the bottom end of the cylinder 8, a further passage such as 15A may be provided in such a position that it will not be sealed by abutment. Within the hollow piston 14 there is slidably fitted an inner piston 16 which can move relatively upwards in the piston 14 against a compression spring 17. The piston 16 is preferably shaped as a hollow cup so that it may contain liquid. The spring 17 is a comparatively light spring merely sufficient to ensure the full extension of the shock absorber when the shock absorber is substantially unloaded. The cylinder 8 and interior of the piston 16 are filled with liquid, when the piston 16 is in its lowermost relative position within the piston 14. The piston 14 has a pin joint fitting at 18 to attach it to the other of the two parts between which the shock absorber is operative.

When initial compressive load is applied in the shock absorber, the piston 14 is forced into the cylinder 8 and consequently displaces liquid through the passages 15, 15A (and against the resistance imposed by these passages) whereby the piston 16 is forced relatively upwards, the spring 17 being compressed during such action. This action continues to take place until the first part of the total shock absorber deflection has been taken up when the piston 14 bottoms in the cylinder 8, and preferably simultaneously the piston 16 abuts against the top end of the chamber in which it slides. It is, of course, to be understood that the various relatively sliding parts are provided with appropriate packings, to make them fluid-tight, having regard to the pressures to be withstood. During this first part of the total stroke, the action is almost wholly concerned with the dissipation of energy which is due to the passage of the liquid through 15, 15A. During any further stroke which may be caused by the continued application of load, the plunger 11 moving into the cylinder 7 allows resilient deflection of the shock absorber, and this action is accompanied by further energy-dissipation due to the displacement of liquid from one side to the other of the damping head 12a, which energy-dissipating function may be considerably enhanced as deflection proceeds, by the fact that the viscosity of the liquid will increase as its pressure is increased.

It will be appreciated that this tandem arrangement of means which on the one hand are primarily energy-dissipating and on the other hand primarily resilient, results in the attributes first set out above, and the shock absorber is therefore particularly suitable for use in aircraft undercarriages. It is also to be understood that the precise means by which part of the stroke involves energy-dissipation primarily, is not limited to the construction described in relation to the drawings, this arrangement, however, being regarded as a particularly suitable arrangement of energy-dissipating device.

Figure 3 illustrates the application of a shock absorber constructed according to Figures 1 and 2, in an aircraft undercarriage. The pin joint 18 connects the piston 14 to a fitting 19 in the bottom end of a tubular cantilever undercarriage leg 20. The fitting 19 has a downward and latteral extension 21 which supports on a pin joint 22, a lever 23. It is to the lever 23 that the pin joint 12 connects the plunger 11. The lever 23 carries a suitable wheel 24 or supports some other form of landing element. It will be noted that the shock absorber which in this figure is represented by 6, 14, is arranged substantially coaxially with the leg 20. Sufficient clearance is provided to allow the shock absorber such slight angular movement as is involved in swinging of the lever 23. In Figure 3 there has been represented in broken line the upper extreme position of the lever 23 and wheel 24, whence it will be seen that the wheel has a movement which is considerably greater in length than the deflection of the shock absorber, the ratio being that due to the length of the lever 23 and position of the joint 12 therein. It follows from this that a particularly compact and light shock absorber is available to be used, and the use of liquid in resilient compression is eminently suited in such a shock absorber when relatively high compression loads are afforded. In the arcuate line indicating the travel of the wheel centre in deflection, the position marked A indicates approximately where the first part of the shock absorber deflection finishes, and the second or more essentially resilient phase commences. As a matter of design therefore, it will be arranged that the joint A is, or approximates to, the position of the wheel centre under the static load of the aircraft.

Referring now to Figures 4 and 5 which illustrate a modified construction working on the same principle as the arrangement illustrated with reference to Figures 1 and 2, energy dissipation is afforded by flow of liquid through the orifice 25 as the piston 26 moves in under load, for instance when the aircraft alights. The preliminary movement of the shock absorber element is afforded purely by energy-dissipation as liquid passes through the orifice 25 from the chamber 27 into the cavity 28. As the volume of liquid is increased in the cavity 28, the piston 29 moves axially compressing the spring 30. The piston 29 has an annular flange 31, the ends of which cooperate with the end walls of the cavity to limit movement of the piston 29. Movement of the piston 26 is likewise limited on the one hand by engagement of the inner end of the piston with the stop flange 32 and on the other hand by the inwardly projecting part of the end cap 33.

In this case the pure resilience is again afforded by the compression of liquid, the plunger 34 displacing liquid filling the high pressure cylinder 35 into the spherical chamber 36 through the damping orifice 37. The plunger 34 has a piston 38, the face of which is directly subjected to the resilient load induced in the liquid by compression thereof.

As with the arrangement described with reference to Figures 1 and 2 the high pressure cylinder is provided with filler plugs 39 and the relative low pressure cylinders also have filler plugs as indicated at 40. Packing glands are indicated at 41, 42 and 43, of which 43 is of a form specially chosen to resist extremely high pressures.

It will be observed that the movement of the shock absorber due to resilient resistance is that which has been taken up by movement of the piston 26 from the Figure 4 position to the Figure 5 position and that movement has been indicated by the arrow X. Likewise the movement available in resilient resistance is the length of the high pressure cylinder 35 which is available to be swept by the piston 38 moving between the end of the cylinder indicated at 44 and the inner end of the stop flange 45. Such movement of the piston 38 compresses all the liquid normally filling both the high pressure cylinder 35 and the spherical chamber 36 under conditions of no load, causing all the said liquid to occupy only the spherical chamber 36 under conditions of maximum resilient load. The range of movement available for affording resilient resistance is indicated by the arrow Y. The total deflection of the shock absorber therefore, can be represented by the movement $X+Y$.

On initial deflection inward movement of the piston 26 merely displaces liquid through the damping orifice 25 eventually filling the cavity 28 and displacing the piston 29 against the resilience afforded by the spring 30. If the initial deflection is sufficiently gradual the initial movement will be afforded entirely by resilient resistance, but on the other hand if the initial deflection is so rapid that the damping orifice 25 cannot allow the requisite flow to be maintained, there will be separate deflection against resilience afforded by compression in the high pressure cylinder 35 and arcuate chamber 36 as the plunger 34 moves in. The two separate deflections obviously therefore work in series and it may again be mentioned that resilience due to elastic compression of liquid in the high pressure cylinder 35 and spherical chamber 36 is accompanied by damping through the passage of liquid through the high pressure damping orifice 37. Although the unit shown in Figures 4 and 5 illustrates a compact form of shock absorber with the minimum of unsupported projecting parts and which is particularly resistant to bending, it is preferred that this resilient unit shall be provided with pin joints as indicated at 46 and 47.

In the arrangement shown with reference to Figure 6 the cylindrical chamber 48 is provided with a plunger indicated at 49 and is filled with liquid. The plunger 49 carries a damping head 50 with damping means indicated generally at 51 and which means broadly comprise a shuttle valve affording different degrees of damping according to the direction of travel. In this case the plunger 49 is formed hollow, thereby providing the cylinder 52. The cylinder 52 communicates with the interior of the cylinder 48, i. e. with the liquid therein, by means of a passage 53, and within the cylinder 52 is provided a sliding piston 54 which has abutment stops 54A which impose finite limits to the stroke of the piston 54 by meeting the ends of the cylinder 52. The piston 54 moreover is urged in the direction of the passage 53 by a compression spring 55 housed within the cylinder 52. It may be found possible to dispense with the stops 54A, or at any rate the lower stop in relying upon the spring 55 becoming coil-bound when fully compressed. The cylinder 52 being hermetic, untrapped air beneath the piston 54 will, by its compression, assist the spring 55. The capacity of the cylinder 52 to receive liquid subject to displacement of the piston 54 downwards is small relative to the volume which will be displaced by the plunger 49 in the cylinder 48 in the course of a complete working stroke. The operation is therefore as follows. Initial compressive movement between the parts 48, 49 causes displacement of liquid (a) through the damping means (shuttle valve 51) and (b) through the passage 53 into the cylinder 52, the latter displacement being resiliently resisted by the spring 55 and entrapped air. This action is regarded as initial until the piston 54 is in its lowermost position, whereat it is definitely stopped. Further compressive movement of the plunger 49 into the cylinder 48 necessarily entails elastic compression of liquid in the cylinder 48 and proportionate compression of the liquid in the cylinder 52. It will be noted that the total quantity of liquid so compressed is still the total quantity which was originally contained in the cylinder 48. Continued compression movement, whilst compressing the whole of the liquid, also displaces liquid through the damping means 51, thus virtually the whole of the liquid, as well as being compressed, is also subjected to passage through the damping means and the maximum amount of energy can thus be dissipated for the given quantity of liquid. Devices according to the present invention are intended to be used with pressures of the order of twenty thousand pounds per square inch, fifty thousand pounds per square inch, or even greater and the viscosity of the liquid will be found to increase very greatly as it continues to be compressed so that towards the end of the compression or working stroke a greater comparative rate of energy dissipation is achieved. This progressive increase in damping is regarded as an important advantage. The passage 53 may be of such a nature as in itself to afford substantial energy dissipation and may be provided with a shuttling element such as 51. It will be noted that as the pressure increases within the device, so the wall of the cylinder 52 (plunger 49) is progressively increasingly enclosed within the cylinder 48 and therefore the thickness necessary for mechanical strength need not be as great as if the wall had to withstand the same very high pressure difference as is withstood by the wall of the cylinder 48.

It will be understood that I desire to comprehend within my invention such modifications as come within the scope of the claims and the invention.

What I claim is:

1. Aircraft landing gear comprising a structure supporting the landing element and shock-absorber means for yieldably restraining shock-absorbing movement of said landing element, said shock-absorber comprising a liquid-filled chamber; means to displace liquid in said chamber through orifice means during part of the deflection of the shock-absorber for energy dissipating purposes without substantial resilient resistance, and means for compressing liquid elastically to afford resilient resistance in a further part of said deflection.

2. In aircraft landing gear, shock-absorbing means comprising a first chamber containing liquid, means for displacing such liquid during part of the deflection of said shock-absorber through orifice means for energy dissipating purposes, a second chamber filled with liquid, and plunger means extending into said second chamber to compress liquid elastically so as to afford resilient resistance in operation of said shock-absorber.

3. Shock-absorber means including a liquid-filled chamber, plunger means extending thereinto to compress said liquid elastically to afford resilient resistance, said chamber being slidable in deflection within a cylinder including orifice means acting as an energy-dissipation device on displacement of liquid therethrough by inward movement of said chamber.

4. In a suspension system, the combination of a liquid chamber having liquid therein, a plunger mounting a damping head adapted to move within said chamber under axial load to displace liquid therein and to compress resiliently the liquid therein due to entry of said plunger into said chamber, said damping head having a passage therethrough for damping, a second liquid chamber a wall of which is connected in series with a wall of the first chamber and having liquid therein, a hollow piston for traversing said second chamber and having a passage in the head thereof to permit displacement of liquid from said second chamber into said piston, a second piston within said first piston for traversing said first piston, and a comparatively weak spring for urging said second piston against the head of said first piston until moved by said displacement of said liquid from said second chamber, whereby in a primary stage of operation under axial load liquid is displaced against resilient resistance which is comparatively weak, said displacement resulting in energy dissipation afforded by restricted liquid flow through said passage in said first piston head, whereas in a secondary stage liquid is compressed in said first chamber to obtain resilient resistance due to the elastic restoring forces of the liquid placed under compression.

5. In a suspension system, resilient shock-absorber means comprising a liquid compression chamber, means in said chamber for varying the volume of the liquid, said chamber and means being connected to said suspension system for absorbing shocks, in which the initial deflection of the shock-absorbing means displaces said liquid against resilient resistance which is comparatively weak and further deflection compressing the liquid encounters resilient resistance due to the elastic restoring forces of the compressed liquid, and means by which comparatively weak resilient resistance is provided comprising an auxiliary chamber with which the said liquid communicates and containing a piston working against a spring within defined limits.

6. In a suspension system, resilient shock-absorber means comprising a liquid compression chamber, plunger means in said chamber for varying the volume of the liquid, said chamber and plunger means being connected to said suspension system for absorbing shock, in which the initial deflection of the shock-absorbing means displaces the said liquid against resilient resistance which is comparatively weak, and further deflection compressing the liquid encounters resilient resistance due to the elastic restoring forces of the compressed liquid, the means by which said comparatively weak resilient resistance is provided comprising an auxiliary chamber, with which the said liquid communicates, containing a piston working against a spring within defined limits in said auxiliary chamber, said auxiliary chamber being formed within said plunger means.

7. In a suspension system, resilient shock-absorber means comprising a liquid compression chamber, plunger means in said chamber for varying the volume of the liquid, said chamber and plunger means being connected to said suspension system for absorbing shock, in which the initial deflection of the shock-absorbing means displaces the said liquid against resilient resistance which is comparatively weak, and further deflection compressing the liquid encounters resilient resistance due to the elastic restoring forces of the compressed liquid, the means by which comparatively weak resilient resistance is provided comprising an auxiliary chamber with which the said liquid communicates, containing a piston working against a spring within defined limits, said auxiliary chamber being formed within said plunger means, and means associated with the entrance to the auxiliary chamber to form a flow resistance passage for damping.

8. In a suspension system, resilient shock-absorber means connected between relatively moving parts of the suspension system comprising a liquid-containing chamber and a plunger operating in said chamber to compress liquid therein under axial load, said plunger having a damping passageway therethrough with means for controlling the flow of liquid through said passageway, the initial yield of the shock-absorbing means displacing the said liquid against resilient resistance which is comparatively weak, said displacement involving energy dissipation afforded by flow of liquid through said passageway, further yield compressing the said liquid to induce the resilient resistance consequent upon the elastic restoring forces of the compressed liquid, the initial stage of yield extending to and ceasing at or about the region to which the deflection of the shock-absorbing means extends under normal loads.

9. In a suspension system for vehicles, aircraft and the like, a leg member, a lever member pivoted to said leg member, shock absorber means constituted by a cylinder connected to one of said members and a hollow plunger extending into said cylinder and connected to the other of said members, said cylinder having liquid therein adapted to be resiliently compressed on inward movement of said hollow plunger whereby to control angular movement of said lever member relative to said leg member, said hollow plunger comprising a supplementary chamber terminating in a damping head slidably fitting said cylinder into which liquid can flow under axial load through restricted liquid flow-resistance passage means in said damping head and the wall of said hollow plunger to provide a stage of energy dissipation supplementary to the resilient compression of the liquid.

10. In combination, in a suspension system, a leg member and a lever member pivoted thereon, a landing wheel mounted on said lever, a plunger connected thereto, a damping head on said plunger, a cylinder connected to said leg having liquid compressible therein on axial movement of said plunger inwardly with respect to said cylinder, an auxiliary chamber, and means through said plunger communicating with said auxiliary chamber to form a restricted passage to resist passage of liquid for damping.

11. Shock-absorber means comprising a pair of separate chambers arranged in tandem, a plunger emerging from one end of one chamber which is filled with liquid for elastically compressing the liquid therein when the plunger enters the chamber, and a piston emerging from the opposite end of the other chamber which contains liquid and having an orifice therein, the second chamber and its piston being adapted to operate as an energy-dissipating device by the displacement of liquid through the orifice.

12. Shock-absorber means as set forth in claim 11, in which the plunger has associated with it a damping head to displace liquid within the cooperating chamber and consequently to dissipate energy in the movements of the plunger.

13. Shock-absorber means comprising a cylinder body in which are formed in tandem and coaxially two cylindrical chambers, one of which is filled with liquid and has an associated plunger to compress such liquid elastically, whilst the other contains liquid and has an associated piston to displace liquid through damping orifice means into a recipient chamber.

14. In aircraft alighting gear a leg, lever means pivoted to said leg for swinging up and down, a landing element mounted on said lever remote from the pivot thereof on the leg, and a telescopic shock-absorber pivotally connected between said leg and said lever to resist swinging of said lever under the influence of landing and taxiing loads; said shock-absorber comprising a dashpot device for energy-dissipation arranged to operate in series with a resilient device of which resilience is due (or mainly due) to the elastic compression of liquid.

15. In aircraft alighting gear, a leg, lever means pivoted to said leg for swinging up and down, a landing element mounted on said lever remote from said pivot, and a telescopic shock-absorber pivotally connected between said leg and said lever to resist swinging of said lever under the influence of landing and taxiing loads; said telescopic shock-absorber comprising a pair of separate chambers arranged in tandem, a plunger emerging from one end of one chamber which is filled with entrapped liquid compressible under load by the plunger and a piston emerging from the opposite end of the other chamber which contains liquid and having an orifice therein, the said other chamber and its piston being adapted to operate as the energy-dissipating device by displacement of liquid through an orifice.

16. An arrangement as set forth in claim 15, in which the plunger has associated with it a damping head slidably fitting the shock-absorber and operating to displace liquid within the liquid-filled chamber whereby to dissipate energy as a result of liquid flow from one side to the other of said plunger as it moves under axial load.

GEORGE HERBERT DOWTY.